(12) United States Patent
Butler et al.

(10) Patent No.: US 7,076,635 B1
(45) Date of Patent: Jul. 11, 2006

(54) METHOD AND APPARATUS FOR REDUCING INSTRUCTION TLB ACCESSES

(75) Inventors: Michael G. Butler, San Jose, CA (US); S. Craig Nelson, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 342 days.

(21) Appl. No.: 10/655,389

(22) Filed: Sep. 4, 2003

(51) Int. Cl.
*G06F 12/00* (2006.01)

(52) U.S. Cl. .................. 711/213; 711/205; 711/207

(58) Field of Classification Search ............... None
See application file for complete search history.

(56) References Cited

U.S. PATENT DOCUMENTS

| | | | |
|---|---|---|---|
| 5,860,145 A * | 1/1999 | Nogami ................ | 711/207 |
| 6,079,003 A | 6/2000 | Witt et al. | |
| 6,079,005 A | 6/2000 | Witt et al. | |
| 6,324,634 B1 * | 11/2001 | Yoshioka et al. .......... | 711/205 |
| 6,604,184 B1 | 8/2003 | Zahir et al. | |
| 6,646,899 B1 | 11/2003 | Yiu et al. | |
| 6,678,815 B1 * | 1/2004 | Mathews et al. .......... | 711/205 |
| 6,681,312 B1 | 1/2004 | Mackawa | |

OTHER PUBLICATIONS

Kobayashi, Ryotaro et al., "A Cost-Effective Branch Target Buffer with a Two-Level Table Organization", Proceedings of the Second International Symposium of Low-Power and High-Speed Chips (COOL Chips II), p. 267, Apr. 1999.

* cited by examiner

*Primary Examiner*—Mano Padmanabhan
*Assistant Examiner*—Duc T Doan
(74) *Attorney, Agent, or Firm*—Meyertons Hood Kivlin Kowert & Goetzel, P.C.; B. Noël Kivlin

(57) ABSTRACT

A method and apparatus for reducing instruction ITLB accesses. In one embodiment, the method may comprise generating a next virtual fetch address corresponding to an instruction fetch request and determining whether a current physical address translation is valid for the next virtual fetch address in response to its generation, wherein the determination may comprise detecting a change in the virtual page number of the next virtual fetch address relative to a virtual page number of a current virtual fetch address. The method may further comprise activating an ITLB circuit in response to determining that the current physical address translation is not valid for the next virtual fetch address, and performing the instruction fetch using the current physical address translation without activating the ITLB circuit in response to determining that the current physical address translation is valid for said next virtual fetch address.

21 Claims, 3 Drawing Sheets

METHOD AND APPARATUS FOR REDUCING INSTRUCTION TLB ACCESSES

BACKGROUND OF THE INVENTION

1. Field of the Invention

This invention relates to computer hardware and, more particularly, to virtual memory mechanisms including address translation mechanisms.

2. Description of the Related Art

Many modern computer systems may include a fixed amount of physical system memory that may serve as a repository for applications and data during computer system operation. Often, physical system memory (or simply physical memory) consists of some form of random access memory (RAM) such as dual data rate synchronous dynamic RAM (DDR-SDRAM), for example. Operating system software may manage how applications and data are organized within physical memory, and system devices such as microprocessors and input/output (I/O) devices may access and modify physical memory contents through mechanisms such as load and store instructions and direct memory access (DMA) transactions, respectively.

Allowing application software to directly access physical memory may present security and stability concerns. For example, a rogue application program may violate system security by attempting to access confidential data residing in physical memory, such as passwords or security codes, for example. Similarly, a runaway program may inadvertently overwrite system data structures and code critical for system operation, such as operating system kernel code and task scheduling tables, resulting in unstable operation or a system crash. Further, providing a fixed amount of physical memory in a system may limit the number and size of applications that can be active at any given time.

To help address these concerns, many computer systems may provide support for a virtual memory mechanism. In one embodiment, such a mechanism may include providing support for a virtual memory address space distinct from the physical memory address space and providing application programs and data access only to the virtual address space. A mapping or translation, referred to herein as a physical address translation, may then be created between a given virtual memory address and a physical memory address by operating system software and/or computer hardware, such as a microprocessor. Virtual memory support may enable computer systems to segregate application code segments from each other and from sensitive data by providing a means of controlling access to privileged physical memory translations.

Virtual memory support may also provide a mechanism to augment the virtual address space available for application programs and data without necessarily increasing the amount of physical memory included in the system. For example, inactive application code may be relocated from physical memory to a slower storage medium such as a hard drive without deallocating the virtual address space occupied by the inactive application code, a process that may be referred to as swapping. The physical address translation for a virtual address may indicate whether the relevant memory contents have been swapped to hard drive storage, so that operating system software may transfer them back to physical memory if a request to the swapped virtual address is made.

In some embodiments, translation of a virtual address to a physical address may be accomplished through multiple levels of indirection, such as by referencing a hierarchy of memory page translation tables defined by operating system software and/or microprocessor support. Such a hierarchical structure may provide flexibility in how a given virtual address may be mapped to a physical address, but traversing such a structure each time a memory access is attempted may be time-consuming. Therefore, in some embodiments, frequently used physical address translations may be cached within a microprocessor structure referred to as a translation lookaside buffer (TLB). In some embodiments, translations may be processed separately for instruction memory accesses and data memory accesses. For example, a microprocessor may include a TLB dedicated to caching instruction fetch-related physical memory translations. Such a TLB may be referred to herein as an instruction TLB (ITLB).

A larger ITLB may be able to cache more physical address translations, which may result in improved performance as the number of hierarchical translation table references during the course of instruction fetching is reduced. However, as an ITLB increases in size, its power consumption and access latency may increase accordingly. Increased power consumption in microprocessors may result in more expensive system costs, such as more sophisticated thermal management solutions to remove additional waste heat as well as more robust power supplies to supply the increased system power demands. Therefore, the increased power consumption associated with ITLB accesses may contribute to increased system costs due to overall microprocessor power consumption.

SUMMARY OF THE INVENTION

Various embodiments of a method and an apparatus for reducing instruction TLB accesses are disclosed. In one embodiment, the method may comprise generating a next virtual fetch address corresponding to an instruction fetch request and determining whether a current physical address translation is valid for the next virtual fetch address in response to its generation, wherein the determination may comprise detecting a change in the virtual page number of the next virtual fetch address relative to a virtual page number of a current virtual fetch address. The method may further comprise activating an ITLB circuit in response to determining that the current physical address translation is not valid for the next virtual fetch address, and performing the instruction fetch using the current physical address translation without activating the ITLB circuit in response to determining that the current physical address translation is valid for said next virtual fetch address.

Figure 1:
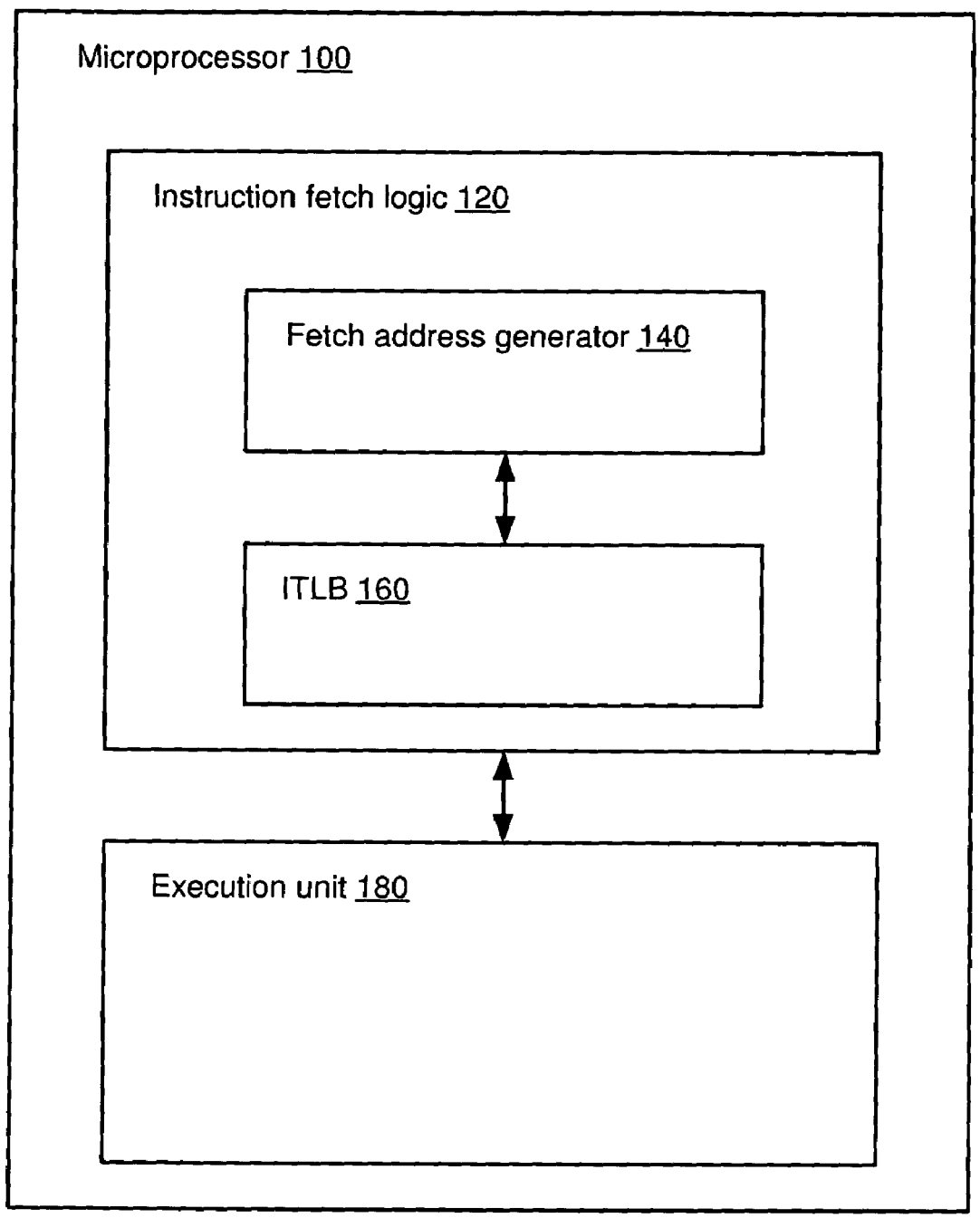
FIG. 1 is a block diagram illustrating one embodiment of an exemplary microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

System Overview

Turning now to FIG. 1, a block diagram of one embodiment of an exemplary microprocessor is shown. Microprocessor 100 may be configured to execute instructions stored in a system memory (not shown). Many of these instructions may operate on data stored in the system memory. It is noted that the system memory may be physically distributed throughout a computer system and may be accessed by one or more microprocessors such as microprocessor 100, for example. In one embodiment, microprocessor 100 is an example of a microprocessor that implements the x86 architecture such as an Athlon™ processor, for example. However, other embodiments are contemplated that include other types of microprocessors.

In the illustrated embodiment, microprocessor 100 includes instruction fetch logic 120 coupled to execution unit 180. Execution unit 180 may be configured to execute instructions fetched and decoded by instruction fetch logic 120, such as arithmetic instructions or load/store instructions, for example. In one embodiment, execution unit 180 may include separate functional units (not shown), such as an arithmetic logic unit (ALU), a floating point unit (FPU), a load/store unit, or a combination of one or more of these. Execution unit 180 may also be configured to send status information to instruction fetch logic 120. For example, execution unit 180 may send status information regarding numeric faults or exceptions encountered during execution to instruction fetch logic 120 for processing.

In the illustrated embodiment, instruction fetch logic 120 includes fetch address generator 140 coupled to instruction translation lookaside buffer (ITLB) 160. In some embodiments, instruction fetch logic 120 may include an instruction cache (not shown). Alternatively, instruction fetch logic may be coupled to receive instructions from such a cache located elsewhere within microprocessor 100 or from another source, such as system memory.

Fetch address generator 140 may be configured to coordinate the retrieval of instructions to be decoded and executed by generating an address corresponding to a particular location in system memory in response to an instruction fetch request. In some embodiments, fetch address generator 140 may be configured to store the information about currently executing instructions and to use such information to determine the addresses of specific instruction fetch requests. For example, fetch address generator 140 may be configured to determine the length of a given currently executing instruction, which coupled with the address of the given currently executing instruction may indicate the address of the next instruction to be fetched. Alternatively, fetch address generator 140 may generate an address that speculatively fetches an arbitrary number of instruction bytes ahead of a currently executing instruction, such as when fetching in accordance with a predicted outcome of a conditional branch instruction, for example.

Virtual Memory and ITLB

In some embodiments, microprocessor 100 may support a virtual memory mechanism. Generally speaking, a virtual memory mechanism may define at least two address spaces: a virtual address space, addresses in which may be visible to application programs; and a physical address space, addresses in which may correspond to physical addresses of a system memory and that may not be visible to application programs. It is noted that the terms virtual address, linear address, and logical address may be used interchangeably herein. A virtual memory mechanism including a virtual address space and a physical address space may allow privileged software, such as operating system kernel software, to map or translate virtual addresses to physical addresses. Performing such a mapping may provide numerous advantages, such as the ability to locate applications in arbitrary regions of a system memory, the ability to protect specific regions of system memory from access by insufficiently privileged applications, the ability for multiple application programs in different virtual address regions to share code in a single physical address region, and the ability to support a larger virtual address space than there exists physical memory in a given system, for example.

Rather than translate an entire virtual address to a specific physical address, in some embodiments a virtual memory mechanism may perform such translations on the basis of virtual and physical memory pages. Such mechanisms may be referred to herein as paged virtual memory mechanisms. As used herein, a memory page refers to a plurality of addressable locations within an address space. In some embodiments, only one size of memory page may be defined, while other embodiments may define multiple memory page sizes and may use multiple differently sized pages simultaneously.

In one embodiment, the addressable locations within a memory page may be contiguous. In such an embodiment, the least significant bits of a virtual or physical address corresponding to the size of a given page may represent an index into that given page, whereas virtual address bits more significant than the page index bits may represent a virtual page number, and physical address bits more significant than the page index bits may represent a physical page number. For example, in one embodiment, both 4 KB and 4 MB pages may be defined, the virtual address space may comprise 40 address bits, and the physical address space may comprise 32 address bits. In such an embodiment, the least significant 12 bits of a virtual or physical address may indicate the index into a 4 KB page (since $2^{12}$=4 KB). Correspondingly, for a 4 KB page in this embodiment, bits 39:12 of the virtual address may specify a virtual page number, while bits 31:12 of the physical address may specify a physical page number. For a 4 MB page, the page index bits may correspond to the least significant 22 bits of a virtual or physical address (since $2^{22}$=4 MB) and the virtual and physical page numbers may respectively correspond to bits 39:22 and 31:22 of the virtual and physical addresses. It is noted that in other embodiments, different page sizes and address space sizes may be defined. Further, it is contemplated that in some embodiments, the addressable locations comprising a page may not be contiguous, and that page index bits may be interleaved with logical and/or physical page number bits.

Generally speaking, if the virtual page number of a virtual address is mapped or translated to a particular physical page number, a load or store to that virtual address may result in a load or store to the corresponding page index of the mapped physical page. The mapping between virtual and physical page numbers may be complex, particularly in system including large numbers of each type of page. In some embodiments, the virtual page number may be partitioned into subfields that may be used to index a hierarchical system of page tables, which may be traversed when translating a virtual page number to a physical page number. After a translation for a given virtual page number has been determined, it may be stored in a translation lookaside buffer (TLB). Subsequent accesses may query the TLB to determine if a valid translation is stored therein, thereby potentially reducing the overhead of translating virtual page numbers for frequently accessed pages.

In an embodiment of microprocessor 100 that includes paged virtual memory support, the fetch address generated by fetch address generator 140 may be a virtual address requiring translation to a physical address for the instruction fetch to complete. In the illustrated embodiment, instruction translation lookaside buffer (ITLB) 160 may be configured to store physical address translations of virtual page numbers corresponding to instruction fetch requests. In one embodiment, ITLB 160 may include a plurality of entries, each including a physical page number indexed by a corresponding virtual page number. The plurality of entries may correspond to a subset of most-frequently-accessed virtual page numbers for instruction fetch requests. When ITLB 160 is activated by an ITLB request event, it may determine if it includes a valid physical address translation for a given instruction fetch request by comparing the virtual page number of the given request against the virtual page number indexing each stored ITLB entry. If a stored ITLB entry matches the given fetch request and is valid, the physical page number stored in the entry may be used as the physical address translation of the given request, thereby bypassing the address translation mechanism.

ITLB Access Filtering

In some embodiments, ITLB 160 may be a large circuit structure with numerous entries. The power required to activate ITLB 160 and determine the presence of a valid physical address translation may be higher than the quiescent power required for ITLB 160 to retain its contents without activation, and the activation power may increase as the number of entries included in a given embodiment of ITLB 160 increases. Also, as described in further detail below, not every instruction fetch requests may require new physical address translations. Therefore, it may be advantageous to reduce or filter instruction fetch request accesses to the ITLB, thereby reducing the overall power consumption of microprocessor 100.

Figure 2:
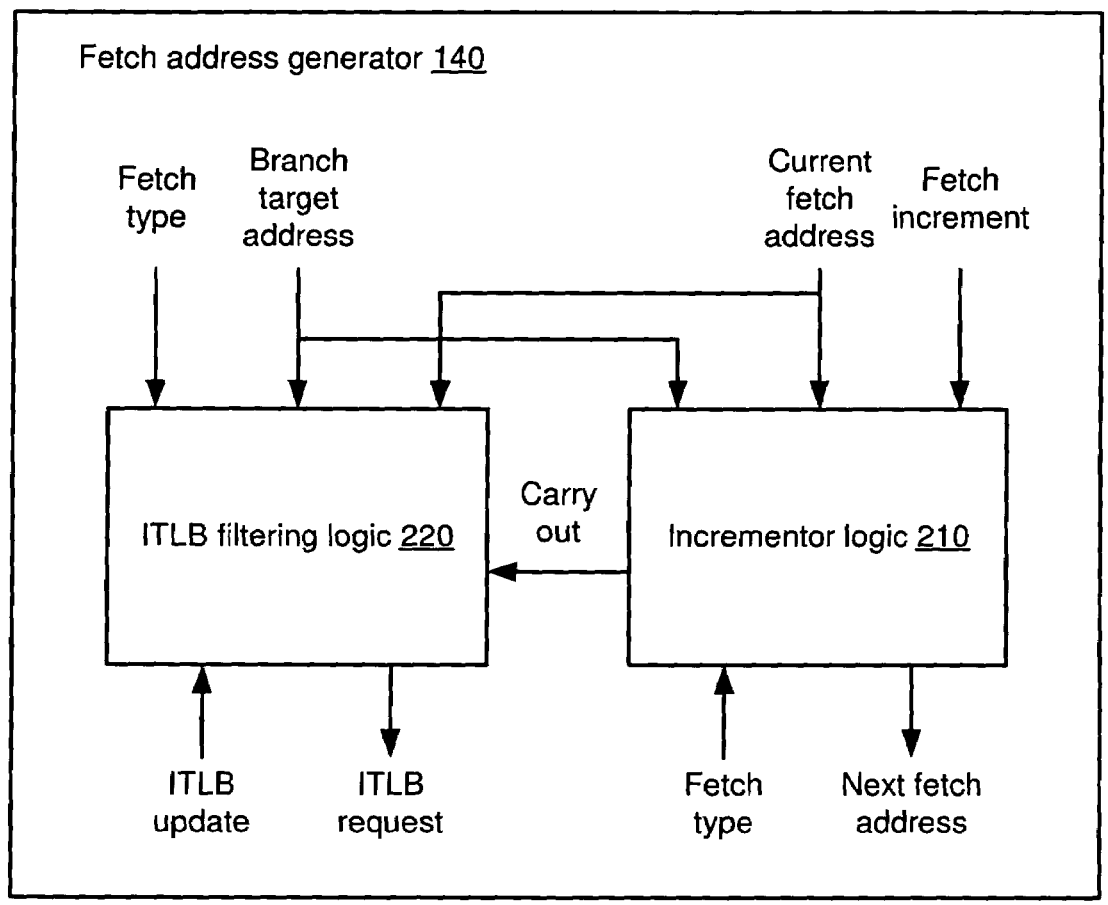
FIG. 2 is a block diagram illustrating one embodiment of a fetch address generator.

Turning now to FIG. 2, a block diagram illustrating one embodiment of a fetch address generator is shown. In the illustrated embodiment, fetch address generator 140 includes incrementor logic 210 coupled to ITLB filtering logic 220. Both incrementor logic 210 and ITLB filtering logic 220 are coupled to receive a current fetch address signal, a branch target address signal, and a fetch type signal. Additionally, incrementor logic 210 is coupled to receive a fetch increment signal and to produce a carry out signal coupled to ITLB filtering logic 220 as well as a next fetch address signal. ITLB filtering logic is coupled to receive an ITLB update signal and to produce an ITLB request signal. In one embodiment, assertion of the ITLB request signal may cause ITLB 160 of FIG. 1 to be activated as described above.

In one embodiment, fetch address generator 140 may be configured to generate instruction fetch addresses corresponding to instruction fetch requests and to filter unnecessary accesses to ITLB 160 of FIG. 1 that may result from such fetch requests. In the illustrated embodiment, a given fetch request may be a sequential fetch type or a branch (i.e., nonsequential) fetch type. For example, if no branches are encountered in the execution of a portion of a program, instruction fetching may proceed sequentially from the current fetch address. However, if a branch instruction is encountered that changes the flow of execution to a new target address, instruction fetching may proceed from the branch target address.

In one embodiment, incrementor logic 210 may be configured to generate a next fetch address corresponding to a given fetch request dependent on the fetch type signal. If the fetch type signal indicates that the given fetch request is a sequential fetch type, incrementor logic 210 may add the value of the received current fetch address to the received fetch increment value and select this sum as the next fetch address. In some embodiments, the fetch increment value may vary for different fetch requests. In other embodiments, the fetch increment value may be fixed and implicit in the logic of incrementor logic 210, in which case the fetch increment signal may be omitted. If the fetch type signal indicates that the given fetch request is a branch fetch type, incrementor logic 210 may select the received branch target address as the next fetch address.

In the illustrated embodiment, the current fetch address, next fetch address, and branch target address may be virtual addresses. The resulting next fetch address may therefore need to be translated to a physical address. The physical address translation corresponding to the current fetch address (referred to herein as the current physical address translation) may be a valid physical address translation for the generated next fetch address. However, under some conditions the current physical address translation may not be valid for the generated next fetch address. Specifically, in one embodiment the current physical address translation may not be valid for the next fetch address if the virtual page number of the next fetch address is different from the virtual page number of the current fetch address, or if the physical address translation has changed in ITLB 160.

In one embodiment, ITLB filtering logic 220 may be configured to determine whether the current physical address translation may be valid for the next fetch address according to the conditions described above. ITLB filtering logic 220 may store a copy of the current physical address translation. With respect to the first condition, in the illustrated embodiment, ITLB filtering logic 220 may be configured to detect a change in the virtual page number of the next fetch address dependent on the fetch type signal. If the fetch type signal indicates that the fetch request is a sequential fetch type, the next fetch address may be produced by incrementing the current fetch address as described above. Correspondingly, ITLB filtering logic 220 may be configured to detect a carry out of the increment operation at a bit position corresponding to the current virtual page size. For example, if the current virtual page size is 4 KB, incrementor logic 210 may convey the carry out of bit 11 to ITLB filtering logic 220. If ITLB filtering logic 220 detects a carry out of the next fetch address at the specified position, the virtual page number of the next fetch address may have changed, and ITLB filtering logic 220 may locally invalidate its copy of the current physical address translation and assert the ITLB request signal for the next fetch address, indicating that an ITLB access to obtain a valid physical address translation may be required.

If the fetch type signal indicates that the fetch request is a branch fetch type, the next fetch address may be produced by selecting the branch target address as described above. Correspondingly, ITLB filtering logic 220 may be configured to compare the virtual page number of the current fetch address with the virtual page number of the branch target address. If this comparison indicates that the two virtual page numbers differ, the virtual page number of the next fetch address may have changed, and ITLB filtering logic 220 may locally invalidate its copy of the current physical address translation and assert the ITLB request signal for the next fetch address, indicating that an ITLB access to obtain a valid physical address translation may be required.

In an alternative embodiment, microprocessor 100 may include a branch prediction unit (not shown) configured to employ a multiple-level branch target buffer (BTB). In general, a BTB may be used to supply predicted branch target addresses to fetch logic such as fetch address generator 140. In one embodiment of a multiple-level BTB, a larger table and a smaller table may be provided, each indexed by a respective subset of bits of the address corresponding to a given branch instruction. Each table may be organized in a set-associative fashion, wherein a given indexed set may contain more than one entry. Each entry of the larger table may include a tag value, the page index bits of a predicted branch target, as well as an indication of whether the predicted branch target crosses a page boundary such as a 1-bit "far" value. Each entry of the smaller table may include a tag value and the virtual page number bits of a predicted branch target.

In operation, a given branch instruction may index particular sets in each of the larger and smaller tables of the multiple-level BTB using the relevant subsets of address bits of the given instruction. A specific entry of each of the larger and smaller tables may be selected by comparing another subset of the address bits of the given instruction against the tag bits of each entry of the selected set of each table, and selecting an entry with matching tag bits. If the "far" value of the selected entry of the larger table indicates that the predicted target resides in the same virtual page as the given branch instruction, the virtual page number of the branch instruction may be concatenated with the page index bits from the selected entry of the larger table to from the predicted branch target address. Otherwise, the virtual page number selected from the smaller table may be concatenated with the page index bits from the selected entry of the larger table to from the predicted branch target address. Further details regarding multiple-level branch target buffers may be found, for example, in "A Cost-Effective Branch Target Buffer with a Two-Level Table Organization," R. Kobayashi et al., Proceedings of the Second International Symposium on Low-Power and High-Speed Chips (COOL Chips II), p. 267, April 1999.

In an embodiment of microprocessor 100 including a multiple-level BTB such as the embodiment described above, information regarding whether a given predicted branch target address resides in the same virtual page as a given branch instruction may be available within the BTB logic. In such an embodiment, the implementation of ITLB filtering logic 220 may be simplified. Specifically, in such an embodiment, ITLB filtering logic 220 may receive a virtual page transition signal from the BTB, rather than the branch target address, and the logic comparing the virtual page numbers of the branch target address and the current fetch address may be replaced by the received virtual page transition signal. In such an embodiment, if the fetch type of a given instruction fetch request is a branch fetch type and the virtual page transition signal is asserted, ITLB filtering logic 220 may locally invalidate its copy of the current physical address translation and assert the ITLB request signal for the next fetch address, indicating that an ITLB access to obtain a valid physical address translation may be required.

With respect to the second condition, if the ITLB update signal indicates that the contents of ITLB 160 have been updated or invalidated, ITLB filtering logic 220 may locally invalidate its copy of the current physical address translation and assert the ITLB request signal for the next fetch address, indicating that an ITLB access to obtain a valid physical address translation may be required. ITLB filtering logic 220 may keep its copy of the current physical address translation in an invalid state until it receives a valid physical address translation following a subsequent ITLB access. In an alternative embodiment, ITLB 160 may only assert the ITLB update signal when its specific entry corresponding to the copy of the current physical address translation stored by ITLB filtering logic 220 has been modified, thereby preventing invalidation based on changes to unrelated physical address translations. It is noted that in another alternative embodiment, the copy of the current physical address translation may be stored elsewhere within fetch address generator 140 or instruction fetch logic 120.

In an alternative embodiment, ITLB filtering logic 220 may be configured to buffer one or more physical address translations. In the event the physical address translation corresponding to the current fetch address is not valid for the next fetch address, ITLB filtering logic 220 may determine whether one of the buffered physical address translations is valid for the next fetch address. For example, ITLB filtering logic 220 may compare the virtual page number of the next fetch address against the virtual page numbers of each buffered physical address translation. If a match is found, ITLB filtering logic 220 may select the matching buffered physical address translation as the new current physical address translation without asserting the ITLB request signal. If no match is found, ITLB filtering logic 220 may locally invalidate its copy of the current physical address translation and assert the ITLB request signal for the next fetch address, indicating that an ITLB access to obtain a valid physical address translation may be required.

Figure 3:
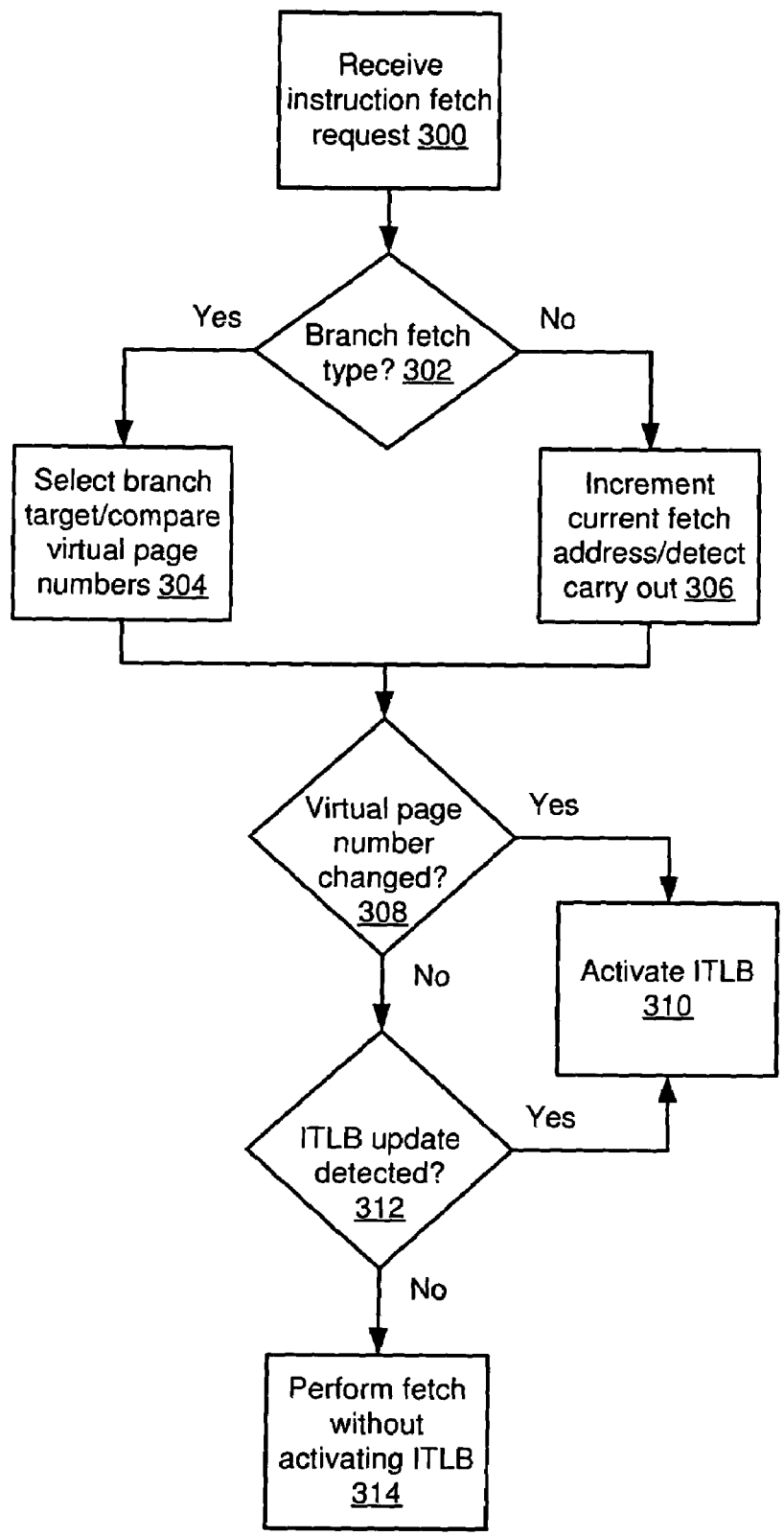
FIG. 3 is a flow diagram illustrating the operation of one embodiment of a fetch address generator.

Referring now to FIG. 3, a flow diagram illustrating the operation of one embodiment of a fetch address generator is shown. Referring collectively to FIG. 1 through FIG. 3, operation begins in block 300 where fetch address generator 140 receives an instruction fetch request to process. The fetch type signal corresponding to the received instruction fetch request may be tested to determine if the received instruction fetch request is a branch type request or a sequential type request (block 302).

If the received instruction fetch request is a branch fetch type, incrementor logic 210 may generate a next virtual fetch address corresponding to the received instruction fetch request by selecting a branch target address. Also, ITLB filtering logic 220 may compare the virtual page number of the next virtual fetch address (in this case, the branch target address) with the virtual page number of a current virtual fetch address, such as a virtual fetch address included in a stored copy of the current physical address translation, for example. In an alternative embodiment, ITLB filtering logic 220 may receive an indication of a virtual page transition from a branch prediction unit, such as the multiple-level branch target buffer described above (block 304).

If the received instruction fetch request is a sequential fetch type, incrementor logic 210 may generate a next virtual fetch address corresponding to the received instruction fetch request by incrementing a current virtual fetch address with a fetch increment value. Also, ITLB filtering logic 220 may detect an arithmetic carry out of the incrementing operation at a bit position corresponding to the current virtual page size. For example, if the current virtual page size is 4 KB, ITLB filtering logic 220 may detect a carry out of the incrementing operation at bit 11 of the next virtual fetch address (block 306)

If ITLB filtering logic 220 detects a mismatch in comparing virtual page numbers in the branch fetch case, or detects a carry out of the appropriate bit position in the sequential fetch case, a change in the virtual page number of the next virtual fetch address may have occurred and the copy of the current physical address translation stored in ITLB filtering logic 220 may no longer be valid (block 308). If such a change has occurred, ITLB filtering logic 220 may invalidate its stored copy of the current physical address translation and activate ITLB 160 by asserting the ITLB request signal. In response, ITLB 160 may determine whether it contains a valid physical address translation corresponding to the next virtual fetch address (block 310).

Returning to block 308, if ITLB filtering logic 220 does not detect that a change in the virtual page number of the next virtual fetch address has occurred, it may detect whether an ITLB update has occurred depending on the assertion of the ITLB update signal. In one embodiment, the ITLB update signal may be asserted whenever any update or invalidate operation occurs to any entry of ITLB 160, while in another embodiment, the ITLB update signal may be asserted when the entry of ITLB 160 corresponding to the stored copy of the current physical address translation in ITLB filtering logic 220 is updated or invalidated (block 312).

If an ITLB update has occurred, operation may continue from block 310 as described above. If an ITLB update has not occurred, the received instruction fetch request may be performed using the current physical address translation without activating ITLB 160 (block 314).

In an alternative embodiment, if ITLB filtering logic 220 is configured to buffer one or more physical address translations, the operation of blocks 308 and 312 may be modified such that if the current physical address translation is determined to be invalid, ITLB filtering logic 220 may determine whether a given buffered physical address translation is valid for the next virtual fetch address, for example by comparing the virtual page number of the next virtual fetch address to the virtual page number of each buffered physical address translation. If a matching translation is found, it may be selected and the received instruction fetch request may be performed using the selected physical address translation without activating ITLB 160. Otherwise, ITLB 160 may be accessed as described in block 310.

It is noted that in another alternative embodiment, the order of virtual page number change detection in block 308 and ITLB update detecting in block 312 may be reversed or that these steps may be performed in parallel.

In the foregoing discussion, signals may be referred to as asserted or de-asserted. As used herein, assertion of a signal refers to driving that signal to a logic 1, while de-assertion of a signal refers to driving that signal to a logic 0. However, it is contemplated that in other embodiments, the logic values used for assertion and de-assertion may be reversed for any given signal.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   generating a next virtual fetch address corresponding to an instruction fetch request;
   determining whether a current physical address translation is valid for said next virtual fetch address in response to said generating, wherein said determining comprises detecting a change in the virtual page number of said next virtual fetch address relative to a virtual page number of a current virtual fetch address;
   activating an ITLB circuit in response to determining that said current physical address translation is not valid for said next virtual fetch address; and
   performing said instruction fetch using said current physical address translation without activating said ITLB circuit in response to determining that said current physical address translation is valid for said next virtual fetch address.

2. The method as recited in claim 1, wherein said determining that said current physical address translation is not valid for said next virtual fetch address further comprises detecting an ITLB update operation.

3. The method as recited in claim 2, wherein said detecting an ITLB update operation further comprises determining that an ITLB entry being modified corresponds to said current physical address translation.

4. The method as recited in claim 1, wherein said generating said next virtual fetch address comprises incrementing said current virtual fetch address by a fetch increment value, and wherein detecting a change in the virtual page number comprises detecting an arithmetic carry out of said incrementing at a bit position corresponding to a current virtual page size.

5. The method as recited in claim 1, wherein said generating said next virtual fetch address comprises selecting a branch target address, and wherein said detecting a change in the virtual page number comprises detecting a difference between a virtual page number of said branch target address and a virtual page number of said current virtual fetch address.

6. The method as recited in claim 1, wherein said generating said next virtual fetch address comprises selecting a branch target address, and wherein said detecting a change in the virtual page number comprises receiving branch prediction information indicative of a virtual page transition.

7. The method as recited in claim 1, further comprising buffering one or more physical address translations, and wherein said determining whether a current physical address translation is valid for said next virtual fetch address further comprises:
   determining whether a given buffered physical address translation is valid for said next virtual fetch address; and
   selecting said given buffered physical address translation as said current physical address translation in response to determining that said given buffered physical address translation is valid for said next virtual fetch address.

8. A fetch address generator comprising:
   incrementor logic configured to generate a next virtual fetch address corresponding to an instruction fetch request; and
   ITLB filtering logic coupled to said incrementor logic, wherein said ITLB filtering logic is configured to:
      determine whether a current physical address translation is valid for said next virtual fetch address in response to said generating, wherein said determining comprises detecting a change in the virtual page number of said next virtual fetch address relative to a virtual page number of a current virtual fetch address; and
      activate an ITLB circuit in response to determining that said current physical address translation is not valid for said next virtual fetch address;
   wherein said fetch address generator is configured to cause said instruction fetch to be performed using said current physical address translation without activating said ITLB circuit in response to said ITLB filtering logic determining that said current physical address translation is valid for said next virtual fetch address.

9. The fetch address generator as recited in claim 8, wherein said determining that said current physical address translation is not valid for said next virtual fetch address further comprises detecting an ITLB update operation.

10. The fetch address generator as recited in claim 9, wherein said detecting an ITLB update operation further comprises determining that an ITLB entry being modified corresponds to said current physical address translation.

11. The fetch address generator as recited in claim 8, wherein said incrementor logic is further configured to increment said current virtual fetch address by a fetch increment value, and wherein detecting a change in the virtual page number comprises detecting an arithmetic carry out of said incrementor logic at a bit position corresponding to a current virtual page size.

12. The fetch address generator as recited in claim 8, wherein said incrementor logic is further configured to select a branch target address, and wherein said detecting a change in the virtual page number comprises detecting a difference between a virtual page number of said branch target address and a virtual page number of said current virtual fetch address.

13. The fetch address generator as recited in claim 8, wherein said incrementor logic is further configured to select a branch target address, and wherein said detecting a change in the virtual page number comprises receiving branch prediction information indicative of a virtual page transition.

14. The fetch address generator as recited in claim 8, wherein said ITLB filtering logic is further configured to:
buffer one or more physical address translations;
determine whether a given buffered physical address translation is valid for said next virtual fetch address; and
select said given buffered physical address translation as said current physical address translation in response to determining that said given buffered physical address translation is valid for said next virtual fetch address.

15. A microprocessor comprising:
an execution unit configured to execute instructions; and
instruction fetch logic coupled to said execution unit and configured to:
generate a next virtual fetch address corresponding to an instruction fetch request;
determine whether a current physical address translation is valid for said next virtual fetch address in response to said generating, wherein said determining comprises detecting a change in the virtual page number of said next virtual fetch address relative to a virtual page number of a current virtual fetch address;

activate an ITLB circuit in response to determining that said current physical address translation is not valid for said next virtual fetch address; and
perform said instruction fetch using said current physical address translation without activating said ITLB circuit in response to determining that said current physical address translation is valid for said next virtual fetch address.

16. The microprocessor as recited in claim 15, wherein said determining that said current physical address translation is not valid for said next virtual fetch address further comprises detecting an ITLB update operation.

17. The microprocessor as recited in claim 16, wherein said detecting an ITLB update operation further comprises determining that an ITLB entry being modified corresponds to said current physical address translation.

18. The microprocessor as recited in claim 15, wherein said generating said next virtual fetch address comprises incrementing said current virtual fetch address by a fetch increment value, and wherein detecting a change in the virtual page number comprises detecting an arithmetic carry out of said incrementing at a bit position corresponding to a current virtual page size.

19. The microprocessor as recited in claim 15, wherein said generating said next virtual fetch address comprises selecting a branch target address, and wherein said detecting a change in the virtual page number comprises detecting a difference between a virtual page number of said branch target address and a virtual page number of said current virtual fetch address.

20. The microprocessor as recited in claim 15, wherein said generating said next virtual fetch address comprises selecting a branch target address, and wherein said detecting a change in the virtual page number comprises receiving branch prediction information indicative of a virtual page transition.

21. The microprocessor as recited in claim 15, wherein said instruction fetch logic is further configured to buffer one or more physical address translations, and wherein said determining whether a current physical address translation is valid for said next virtual fetch address further comprises:
determining whether a given buffered physical address translation is valid for said next virtual fetch address; and
selecting said given buffered physical address translation as said current physical address translation in response to determining that said given buffered physical address translation is valid for said next virtual fetch address.

* * * * *